(12) United States Patent
Page et al.

(10) Patent No.: US 9,346,282 B2
(45) Date of Patent: May 24, 2016

(54) IMAGE PRINTING USING SPECIALTY INK (75) Inventors: Adam F. Page, Vancouver, WA (US); Corlene Ankrum, Vancouver, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1217 days.

(21) Appl. No.: 12/743,259

(22) PCT Filed: Dec. 2, 2007

(86) PCT No.: PCT/US2007/086207
§ 371 (c)(1),
(2), (4) Date: May 17, 2010

(87) PCT Pub. No.: WO2009/073018
PCT Pub. Date: Jun. 11, 2009

(65) Prior Publication Data
US 2010/0245412 A1  Sep. 30, 2010

(51) Int. Cl.
| | |
|---|---|
| B41J 29/38 | (2006.01) |
| B41J 2/195 | (2006.01) |
| B41J 2/17 | (2006.01) |
| B41J 2/175 | (2006.01) |
| B41J 2/21 | (2006.01) |
| G06K 15/02 | (2006.01) |
| H04N 1/54 | (2006.01) |

(52) U.S. Cl.
CPC ............... B41J 2/2107 (2013.01); G06K 15/02 (2013.01); H04N 1/54 (2013.01)

(58) Field of Classification Search
USPC ............................................ 347/84–87, 6–7
See application file for complete search history.

(56) References Cited

U.S. PATENT DOCUMENTS

| | | | |
|---|---|---|---|
| 5,822,503 A | 10/1998 | Gass, Jr. et al. | |
| 6,024,441 A * | 2/2000 | Nishimoto | 347/85 |
| 6,273,541 B1 | 8/2001 | Myung | |
| 6,741,262 B1 | 5/2004 | Munson et al. | |
| 6,951,375 B2 * | 10/2005 | Patton et al. | 347/3 |
| 7,014,301 B2 * | 3/2006 | Dentel et al. | 347/85 |
| 2003/0086101 A1 | 5/2003 | Miyano et al. | |
| 2003/0132994 A1 | 7/2003 | Samuels | |
| 2005/0206925 A1 | 9/2005 | Agehama et al. | |
| 2006/0028667 A1 * | 2/2006 | Saito | 358/1.13 |
| 2007/0035596 A1 | 2/2007 | Gray et al. | |
| 2007/0139671 A1 | 6/2007 | Stevens | |

OTHER PUBLICATIONS

International Search Report Mail Date of Mailing Aug. 26, 2008. International Application No. PCT/US2007/086207. Filing Date: Dec. 2, 2007.

* cited by examiner

*Primary Examiner* — Jason Uhlenhake
(74) *Attorney, Agent, or Firm* — Michael A. Dryja (57) ABSTRACT

An image is printed with an inkjet-printing device using specialty ink (300). The device can use standard cyan ink, standard magenta ink, standard yellow ink, and standard black ink to print full-color images on media. However, the specialty ink is a type of ink other than the types of the standard cyan ink, the standard magenta ink, the standard yellow ink, and the standard black ink. A replacement color ordinarily printed using the standard cyan ink, the standard magenta ink, the standard yellow ink, and/or the standard black ink is determined (306). An image having one or more pixels having the replacement color is printed on the media (316). The pixels that have the replacement color are printed using the specialty ink instead of using the standard cyan ink, the standard magenta ink, the standard yellow ink, and/or the standard black ink.

19 Claims, 4 Drawing Sheets

IMAGE PRINTING USING SPECIALTY INK

BACKGROUND

Inkjet-printing devices, such as inkjet printers and multi-function devices (MFD) and all-in-one (AIO) devices that have inkjet-printing capabilities, print images on media such as paper by ejecting ink onto the media. Inkjet-printing devices include both thermal-inkjet printing devices and piezoelectric printing devices. To print full-color images on media, inkjet-printing devices usually include cyan, magenta, and yellow ink, in addition to or in lieu of black ink.

In addition to these standard cyan, magenta, yellow, and black inks, specialty inks have been developed that can be employed in inkjet-printing devices. Such specialty inks can include metallic ink, glossy ink, and embossing ink. However, inkjet-printing devices may have to be purposefully designed to use these specialty inks. Existing application programs, such as photo-editing programs, publishing programs, and so on, typically have to be specially designed to take advantage of these specialty inks as well.

DETAILED DESCRIPTION OF THE DRAWINGS

Figure 1A:
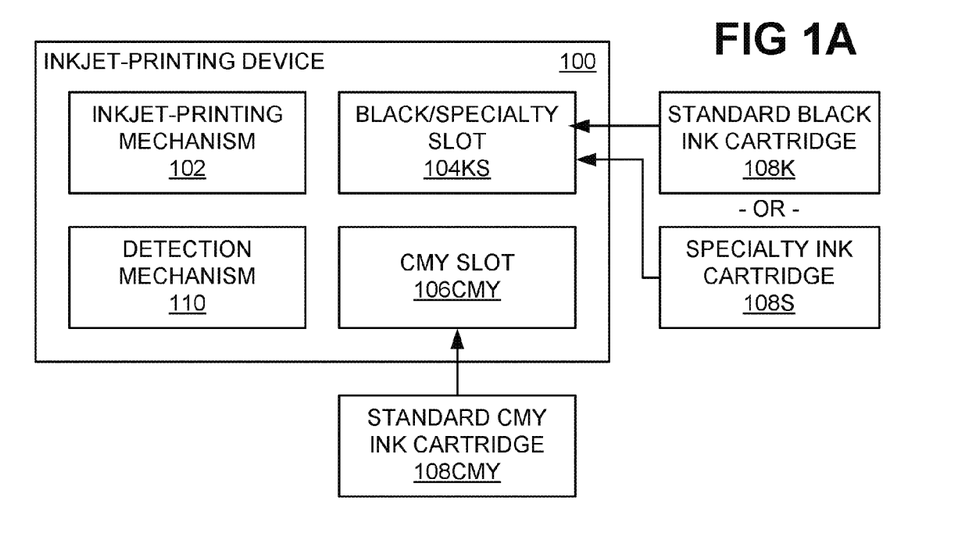
FIGS. 1A and 1B are block diagrams of inkjet-printing devices that are receptive to specialty ink cartridges containing specialty ink, according to different embodiments of the present disclosure.
Figure 1B:
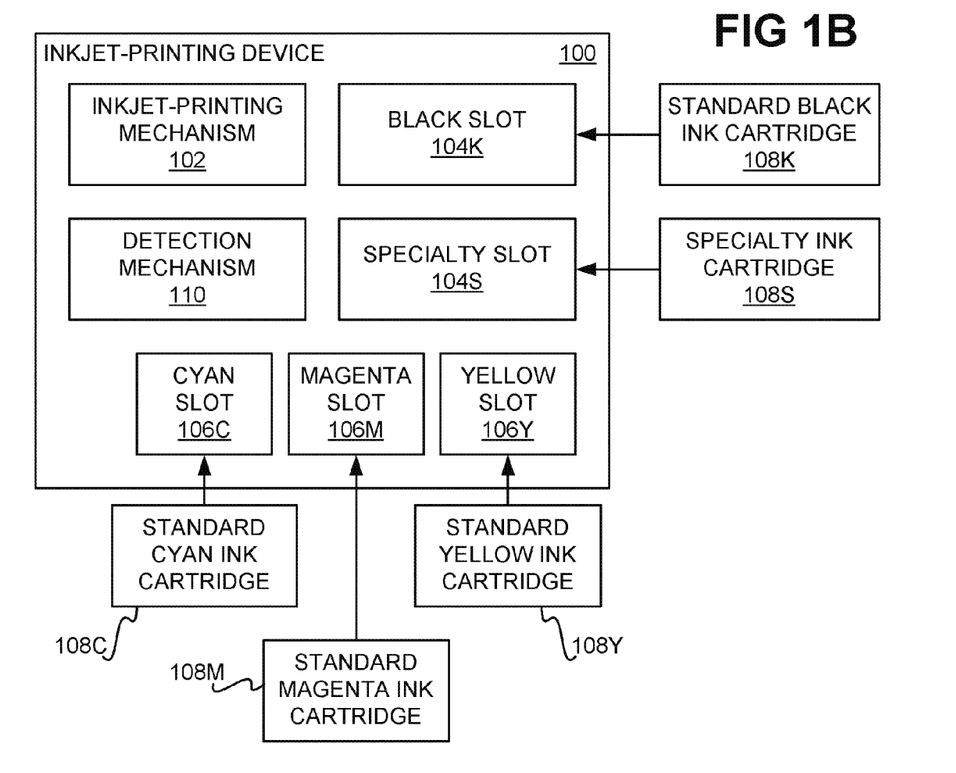

FIGS. 1A and 1B show an inkjet-printing device 100, according to different embodiments of the present disclosure. The inkjet-printing device 100 can be a standalone inkjet printer, having just inkjet-printing functionality. The inkjet-printing device 100 can also be a multi-function device (MFD) or an all-in-one (AIO) device, which has other functionality in addition to inkjet-printing functionality. For example, an MFD or an AIO device may have copying, scanning, and/or faxing functionality, in addition to inkjet-printing functionality. Inkjet-printing functionality is generally defined as being able to print image data, such as graphics and/or text, received from a host computing device like a desktop or a laptop computer, on media such as paper.

In both FIGS. 1A and 1B, the inkjet-printing device 100 includes an inkjet-printing mechanism 102 and a detection mechanism 110. In FIG. 1A, the inkjet-printing device 100 further includes a black/specialty slot 104KS and a cyan-magenta-yellow (CMY) slot 106CMY. By comparison, in FIG. 1B, the inkjet-printing device 100 includes a black slot 104K, a specialty slot 104S, a cyan slot 106C, a magenta slot 106M, and a yellow slot 106Y. Each of the slots 104KS, 104K, 104S, 106CMY, 106C, 106M, and 106Y is receptive to installation of an ink cartridge therein.

In FIG. 1A, the black/specialty slot 104KS is receptive to installation of a standard black ink cartridge 108K containing standard black ink and a specialty ink cartridge 108S containing specialty ink. However, just one of the cartridges 108K and 108S can be inserted into the black/specialty slot 104KS at any given time. Thus, if the cartridge 108K is inserted into the slot 104KS, then the cartridge 108S cannot also be inserted into the slot 104KS at the same time, and vice-versa. The CMY slot 106 CMY is receptive to installation of a standard cyan-magenta-yellow (CMY) ink cartridge 108CMY containing cyan, magenta, and yellow ink.

In FIG. 1B, the black slot 104K is receptive to installation of the standard black ink cartridge 108K, and the specialty slot 104S is receptive to installation of the specialty ink cartridge 108S. The cyan slot 106C is receptive to installation of a standard cyan ink cartridge 108C containing standard cyan ink, whereas the magenta slot 106M is receptive to installation of a standard magenta ink cartridge 108M containing standard magenta ink. The yellow slot 106Y is receptive to installation of a standard yellow ink cartridge 108Y containing standard yellow ink.

Ink is generally defined herein is matter that is an at least partially liquid form, and which includes dyes, pigments, and/or other colorants. Standard ink is generally considered a first type of ink, where the type of this ink is independent of its color, such that cyan, magenta, yellow, and black inks can all be standard inks of the same type, even though they have different colors. Standard ink is further generally defined herein as ink that is normally and ordinarily employed by the inkjet-printing device 100 to print images on media. Where the inkjet-printing device 100 is a photo inkjet-printing device, the standard ink may include photo inks designed to optimally print photos on media, as opposed to regular inks designed to optimally print non-photo graphics and text on media.

For example, standard black ink is ink that is employed by the inkjet-printing device 100 to ordinarily and normally print black images on media. The standard cyan, magenta, and yellow inks, when used alone or in conjunction with the standard black ink, are inks that are employed by the inkjet-printing device 100 to ordinarily and normally print full-color images on media. For instance, each of a spectrum of colors can be realized as a combination of three values (cyan, magenta, yellow) or as a combination of four values (cyan, magenta, yellow, and black). To print such a color on media, the standard cyan, magenta, and yellow inks, or the standard cyan, magenta, yellow, and black inks, are ejected in varying densities or amounts corresponding to the cyan, magenta, yellow values, or the cyan, magenta, yellow, and black values, of the color.

In general, the standard inks are such that upon being ejected onto media, they do not substantially or discernibly rise above the surface of the media upon drying. For example, with regular paper and other types of regular media, the standard inks are substantially absorbed into the media itself, such that the standard inks do not substantially or discernibly rise above the surface of the media upon drying. With glossy paper and other types of photo and glossy media, the standard inks may not substantially absorb into the media itself, and instead dry on the surface of the media, but the standard inks nevertheless do not substantially or discernibly rise above the surface of the media upon drying. This is in comparison to specialty embossing inks, for instance, which dry at least substantially above the surface of the media to realize one or more raised portions—which are also known as relief portions—where such embossing inks have been used.

By comparison, specialty ink is generally considered a second type of ink different than the first type of ink of the standard inks. Specialty ink is further generally defined herein as ink that is not normally and ordinarily employed by the inkjet-printing device 100 to print images on media. For instance, specialty inks can be inks that are not needed and/or are not used to print black and/or full-color images on media. Specialty inks include metallic inks, which are inks that include metallic colorant or actual metallic flakes to render portions of the media printed on using the metallic inks with a metallic look. Specialty inks also include embossing inks, as have been described above, as well as glossy inks. Glossy inks are inks that are glossier than standard inks. Where such standard inks are photo inks, the glossy inks are even glossier than the photo inks. Portions of media printed on using the glossy inks are thus rendered glossier than portions of the media printed on using the standard inks.

Specialty inks may be black in color, but are not considered standard black ink in that they are not employed to ordinarily and normally print black images on media. For example, a user printing text-oriented images on media would not normally and ordinarily employ specialty black ink, but rather would use standard black ink. Likewise, a user printing photo-oriented images on media would not normally and ordinarily employ specialty black ink, but rather would use standard (photo) black ink. In particular, where the standard inks also include standard cyan, magenta, and yellow inks, full-color images may not be (and in at least some embodiments, cannot be) printed on media using the specialty black ink in conjunction with these standard inks. That is—i.e., this means—to print a given color on media, where the color is defined by four values (cyan, magenta, yellow, and black), the specialty black ink is not ejected in varying densities along with the standard cyan, magenta, and yellow to realize the given color in question.

Similarly, where the specialty ink is a specialty non-black ink, the specialty ink nevertheless may not be (and in at least some embodiments cannot be) used to print full-color images on media in conjunction with standard inks. That is—i.e., this means to print a given color on media, where the color is defined by three values (cyan, magenta, and yellow) or four values (cyan, magenta, yellow, and black), the specialty non-black ink cannot be ejected in varying densities along with the standard, cyan, magenta, yellow, and/or black to realize the given color in question. In some embodiments, the specialty ink may have a color that is different than cyan, magenta, or yellow, and thus is different than the normal and ordinary colors (i.e., cyan, magenta, and yellow) employed to realize a spectrum of colors when printing on media. It is noted that the term color as used herein also is inclusive of the color black and the color white.

Referring to both FIGS. 1A and 1B, it is noted that while the inkjet-printing device 100 in these figures is depicted as having a particular configuration and number of slots, in other embodiments, other configurations and numbers of slots may be employed. For example, in FIG. 1A there is one slot 104KS that is receptive to both the standard black ink cartridge 108K and the specialty ink cartridge 108S, whereas in FIG. 1B there are two slots 104K and 104S corresponding to the ink cartridges 108K and 108S, respectively. However, these embodiments may be reversed, such that the inkjet-printing device 100 in FIG. 1A has two slots 104K and 104S, and the device 100 in FIG. 1B has one slot 104KS. Likewise, in FIG. 1A there is one slot 106CMY receptive to a standard CMY ink cartridge 108CMY, whereas in FIG. 1B there are three slots 106C, 106M, and 106Y receptive to standard cyan, magenta, and yellow ink cartridges 108C, 108M, and 108, respectively. These embodiments may also be reversed, such that the inkjet-printing device 100 in FIG. 1A has three slots 106C, 106M, and 106Y, and the device 100 in FIG. 1B has one slot 106CMY.

In both FIGS. 1A and 1B, the inkjet-printing mechanism 102 includes the software, hardware, and/or components so that the inkjet-printing device 100 is able to print images, such as text and/or graphics, onto media like paper and other types of media. The inkjet-printing mechanism 102 may be a thermal inkjet-printing mechanism 102, a piezoelectric inkjet-printing mechanism 102, or another type of inkjet-printing mechanism 102. The inkjet-printing mechanism 102 is operable by selectively ejecting ink of different colors and/or different types onto the media to realize the desired image.

In this respect, it is noted that in one embodiment, the ink cartridges 108K, 108S, 108CMY, 108C, 108M, and 108Y may just include supplies of ink that are employed by the inkjet-printing mechanism 102 to eject ink onto media. In this embodiment, the printheads from which ink is actually ejected are separate from the ink cartridges 108K, 108S, 108CMY, 108C, 108M, and 108Y, and instead are specifically part of just the inkjet-printing mechanism 102. In another embodiment, the ink cartridges 108K, 108S, 108CMY, 108C, 108M, and 108Y may include the supplies of ink as well as the printheads from which ink is actually ejected. In this embodiment, the inkjet-printing mechanism 102 can be said to at least partially overlap, or contain, the ink cartridges 108K, 108S, 108CMY, 108C, 108M, and 108Y, in that both the cartridges 108K, 108S, 108CMY, 108C, 108M, and 108Y and the mechanism 102 are said to include the printheads.

The detection mechanism 110 is implemented in hardware or a combination of hardware and software. In FIG. 1A, the detection mechanism 110 is able to at least detect whether the standard black ink cartridge 108K or the specialty ink cartridge 108S has been inserted into or installed within the black/specialty slot 104KS. In FIG. 1B, the detection mechanism 110 is able to at least detect whether the specialty ink cartridge 108S has been inserted into or installed within the specialty slot 104S. The detection mechanism 110 may employ mechanical, electrical, and/or optical methodologies by which to perform its detection capability.

For example, the specialty ink cartridge 108S may have a particular type of marking on its enclosure, different than the other ink cartridges 108K, 108CMY, 108C, 108M, and 108Y. Upon insertion of the specialty ink cartridge 108S into the slot 104KS or the slot 104S, the detection mechanism 110 may optically detect this marking. As such, the detection mechanism 110 detects that the specialty ink cartridge 108S has been inserted into the slot 104KS or the slot 104S.

As another example, the specialty ink cartridge 108S may have a mechanical feature, such as a tab, groove, notch, and so on, different than the other ink cartridges 108K, 108CMY, 108C, 108M, and 108Y. Upon insertion of the specialty ink cartridge 108S into the slot 104KS or the slot 104S, this mechanical feature interacts with the detection mechanism 110, such that the mechanism 110 detects that the cartridge 108S has been inserted into the slot 104KS or the slot 104S. For instance, the mechanical feature of the specialty ink cartridge 108S may push a corresponding mechanical feature of the detection mechanism 110 that includes an electrical conductor, such that an electrical path is formed or is closed. As another example, the mechanical feature of the specialty ink cartridge 108S may block the reception of light by a light sensor of the detection mechanism 110 as output by a light emitter of the mechanism 110.

As an example of an optical methodology by which to detect the specialty ink cartridge 108S having been inserted into or installed, the cartridge 108S may have human- or machine-readable markings printed thereon. The markings may include one or more bits of data, for instance, imprinted on the cartridge 108S. When the specialty ink cartridge 108S is inserted or installed into the inkjet-printing device 100, the detection mechanism 110 is able to optically or otherwise detect or read these markings. Thereafter, the detection mechanism 110 correlates the markings to being those for the specialty ink cartridge 108S, such that the detection mechanism 110 concludes that the specialty ink cartridge 108S has been installed.

As another example, the specialty ink cartridge 108S may include memory in which one or more bits are stored that correspond to specialty ink being contained within the cartridge 108S. When the specialty ink cartridge 108S is inserted or installed into the inkjet-printing device, the detection mechanism 110 is able to electrically or otherwise detect or retrieve these bits. Thereafter, the detection mechanism 110 correlates these bits to being those for the specialty ink cartridge 108S, such that the mechanism 110D concludes that the specialty ink cartridge 108S has been installed.

Figure 2:
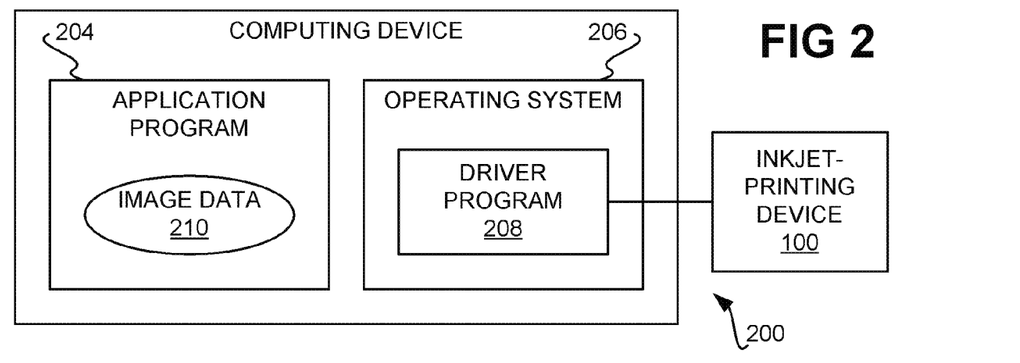
FIG. 2 is a diagram of a system in which an inkjet-printing device prints an image using specialty ink, according to an embodiment of the present disclosure.

FIG. 2 shows a system 200, according to an embodiment of the present disclosure. The system 200 includes the inkjet-printing device 100 and a computing device 202. The computing device 202 can be a desktop computer, a laptop computer, or another type of computing device 202. For instance, the computing device 202 may be a smart phone, a personal digital assistant (PDA) device, a digital camera, or another type of electronic device that has computing capability. Furthermore, just some of the software components of the computing device 202 in particular are depicted in FIG. 2. However, those of ordinary skill within the art can appreciate that the computing device 202 includes hardware components, such as memory, processors, storage devices, and so on, and may also include other software components, in addition to and/or in lieu of those depicted in FIG. 2.

In general, the computing device 202 is said to include an operating system 206 and an application program 204 that runs on or in conjunction with the operating system 206. The operating system 206 can be generally and non-restrictively considered as the master control program of the computing device 202. For example, the operating system 206 sets the standards for all the application programs, including the application program 204, that run on the computing device 202. Such application programs can communicate with the operating system 206 for user interface and file management operations.

The operating system 206 includes a driver program 208 for the inkjet-printing device 100. The driver program 208, which may also be referred to as a device driver, encompasses one or more computer programs that link the operating system 206 to the inkjet-printing device 100. The driver program 208 contains the precise computer code and software to perform the functions requested by application programs, like the application program 204, in relation to the inkjet-printing device 100.

The application program 204 may be generally and non-restrictively considered as any data entry, update, query or report computer program that processes data for the user of the computing device 202. Application programs can includes generic productivity software, such as spreadsheet programs, word processors, database programs, and so on, as well as custom and packaged programs. The application program 204 specifically generates or receives image data 210 that is to be printed on the inkjet-printing device 100 as controlled by the driver program 208 of the operating system 206. The image data 210 itself may include graphics and/or text. The image data 210 may be a digital photo, for instance. The application program 204 can thus be a publishing program, a digital photo-processing program, or another type of a graphics program, for instance.

Figure 3:
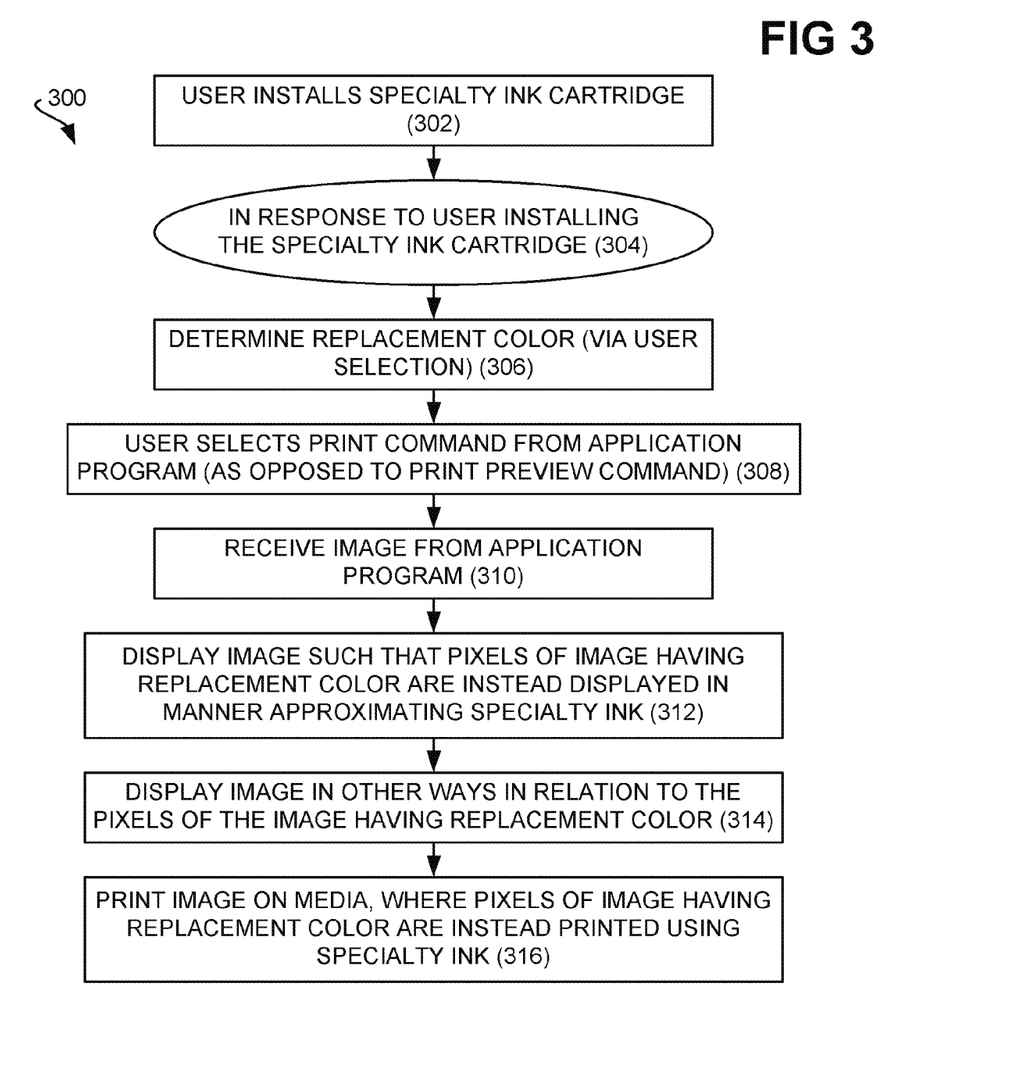
FIG. 3 is a flowchart of a method to print an image with an inkjet-printing device using specialty ink, according to an embodiment of the present disclosure.

FIG. 3 shows a method 300 for printing the image data 210 with the inkjet-printing device 100, using the specialty ink contained within the specialty ink cartridge 108S, according to an embodiment of the present disclosure. The method 300 is described herein in relation to the driver program 208 performing most if not all of the parts of the method 300. In this respect, it can be said that the driver program 208 is implemented as one or more computer programs stored on a computer-readable medium, such as a recordable data storage medium. These computer programs, and hence the driver program 208 itself, is therefore said to perform most if not all of the parts of the method 300 in this embodiment.

A user installs the specialty ink cartridge 108S into the inkjet-printing device 100 (302). In the embodiment of FIG. 1A, the user may remove (i.e., uninstall) the standard black ink cartridge 108K from the black/specialty slot 104KS, and instead insert the specialty ink cartridge 108S in its place in the slot 104KS. The slot 104KS may have been originally designed to receive just the cartridge 108K, but in this embodiment, is also being employed to receive the cartridge 108S as well. In the embodiment of FIG. 1B, the user inserts the specialty ink cartridge 108S into the specialty slot 104S designed to receive just the cartridge 108S, as opposed to any other cartridge. Upon installation of the specialty ink cartridge 108S into the inkjet-printing device 100, the detection mechanism 110 detects this installation, as has been described.

The remainder of the method 300 can be considered as being performed in response to the user installing the specialty ink cartridge 108S into the inkjet-printing device 100 (302). For instance, the inkjet-printing device 100 may communicate to the driver program 208 of the operating system 206 of the computing device 202 that the specialty ink cartridge 108S has been installed herein. As such, the driver program 208 receives such communication from the inkjet-printing device 100 that the specialty ink cartridge 108S has been installed therein.

The method 300 (e.g., the driver program 208) determines what is referred to herein as a replacement color (306), by permitting the user to select this replacement color in at least some embodiments. The replacement color is a color that may be defined by a combination of a red value, a green value, and a blue value. As to the image data 210 that is to be printed on media using the inkjet-printing device 100, any pixels of the image data 210 having this replacement color are instead printed using specialty ink from the specialty ink cartridge 108S.

For example, the replacement color may be determined as a particular shade of yellow, where the image data 210 includes one or more pixels having this particular shade of yellow. Normally and ordinarily, the standard cyan, magenta, yellow, and/or black ink contained within the standard ink cartridges 108K, 108CMY, 108C, 108M, and/or 108Y would be employed to particularly realize this exact color—as closely as possible—when these pixels of the image data 210 printed on media. However, in the method 300, these pixels are instead printed using the specialty ink from the specialty ink cartridge 108S.

It is noted that the specialty ink may have no relationship or association with the replacement color except for the fact that the specialty ink is used to print pixels of the image data 210 that have this replacement color. For example, the replacement color may be a particular shade of yellow, whereas the specialty ink may be metallic silver ink and thus not be considered yellow ink in any way whatsoever. Nevertheless, the pixels of the image data 210 having this particular shade of yellow are printed solely in one embodiment using this specialty ink, instead of being printed with the standard cyan, magenta, and/or black inks to realize this particular shade of yellow as closely as possible.

Figure 4A:
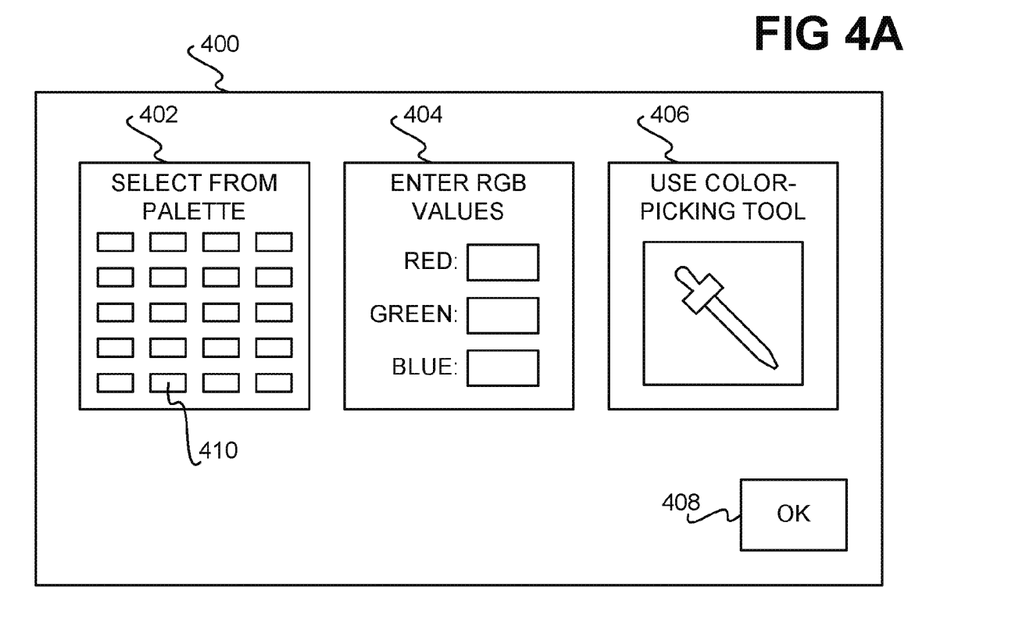
FIGS. 4A, 4B, 4C, and 4D are diagrams of graphical user interface windows that can be employed in the method of FIG. 3, according to different embodiments of the present disclosure.

FIG. 4A shows a graphical user interface window 400 that can be displayed to the user by the driver program 208 for the user to select the replacement color, according to an embodiment of the present disclosure. In particular, the user is permitted to select the replacement color in any of three different ways. First, as depicted in the box 402, the user can select the replacement color from a palette of predetermined colors, where each small box, such as the box 410, represents and shows a particular predetermined color of the palette. Second, as depicted in the box 404, the user can particularly specify the red, green, and blue values that together in combination define the replacement color. Third, as depicted in the box 406, the user can use a color-picking tool, which is also referred to as a color dropper tool, to select a color from an image currently being displayed by the application program 204. Once the user has selected the replacement color in any of these three ways, he or she selects the OK button 408.

Figure 4B:
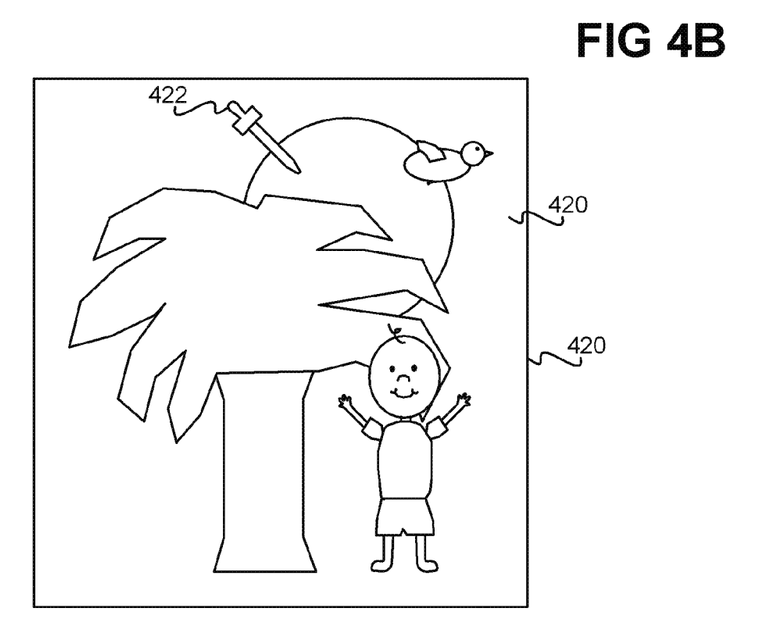

FIG. 4B shows a graphical user interface window 418 that can be displayed to the user by the application program 204, that contains a representative image 420, and from which the user can use a color-picking tool 422 provided by the driver program 208 to select the replacement color, according to an embodiment of the disclosure. In this respect, it is noted that the representative image 420 displayed in the window 418 is not displayed by the driver program 208, but rather is displayed by the application program 204, which is a different computer program that the driver program 208. However, the color-picking tool 422 is provided by the driver program 208.

Within the representative image 420 displayed within the window 418, there is a person, a tree, the sun, and a bird. Each of these elements of the image 420 is displayed in one or more different colors. For example, the person may have a different color for his or her skin, as compared to his or her shirt and/or his or her shorts. The tree may have a different color for its leaves as compared to its trunk. The sun may be one color, and the bird may be another color. As such, the colors of the elements of this representative image 420 may be different from one another, such that the colors of the person may be different than the colors of the tree, which may be different than the color of the sun, which may be different than the color of the bird.

The user, using a pointing device such as a mouse, moves the color-picking tool 422 as a pointer to the desired replacement color, and then selects this color by, for instance, clicking a mouse button on the pointing device. For instance, in the example of FIG. 4B, the user has moved the color-picking tool 422 to point to the sun. Therefore, the user has selected the color of the sun as the replacement color.

It is noted that the replacement color determination may be provided with more advanced functionality than the basic functionality that has been ascribed to determining the replacement color herein. For example, the replacement color may be provided with a tolerance setting. Such a setting may indicate that the range of colors that the replacement color in question encompasses. For example, a tolerance setting of zero may indicate that just the pixels within the image data having the exact color values (such as red, green, and blue color values) of the replacement color are printed with the specialty ink. Tolerance settings greater than zero can specify that pixels within the image data having color values that are close to the exact color values of the replacement color are printed with the specialty ink. As such, the tolerance setting in this respect provides a threshold against which the colors of pixels are compared in relation to the replacement color to determine whether the pixels are printed with the specialty ink.

For example, a user may have selected a particular shade of yellow as the replacement color. If the tolerance setting is zero, then just the pixels of the image data that have this exact shade of yellow are printed with the specialty ink. If the tolerance setting is set to a first value greater than zero, then pixels of the image data that have colors relatively close to this shade of yellow are also printed with the specialty ink. That is, in accordance with a prespecified comparison of a pixel's color to the replacement color, if this prespecified comparison yields a difference less than the tolerance setting (equal to the first value), then the pixel in question is printed with the specialty ink, even though it does not have the exact replacement color's color values. If the tolerance setting is set to a second value greater than the first value, then even more pixels of the image data are also printed with the specialty ink. That is, in accordance with a prespecified comparison of a pixel's color to the replacement color, if this prespecified comparison yields a difference less than the tolerance setting (equal to the second value, which is greater than the first value), then the pixel in question is printed with the specialty ink, even though it does not have the exact replacement color's color values.

Therefore, in one embodiment, the replacement color is specifically defined as a set of color values, such as a set of red, green, and blue color values, that defines exactly one color. In another embodiment, however, where the aforementioned threshold setting is greater than zero, the replacement color is more generally defined as a specified set of color values and those sets of color values that are near the specified set of color values. In this latter embodiment, then, the threshold setting assists in defining how many actual sets of color values are encompassed by the replacement color. In general, for instance, the larger the value of the threshold setting, the greater the number of actual sets of color values that are encompassed by the replacement color.

Referring back to FIG. 3, at some point the user selects the print command from the application program 204 (308), in order to print the image data 210 using the inkjet-printing device 100. It is noted that the user selecting the print command is different than the user selecting a print preview command which may also be available. For example, selecting the print command results in the application program 204 effectively transmitting the image data 210 to the driver program 208 of the operating system 206, so that the driver program 208 can process the image data 210 and accordingly control the inkjet-printing device 100 to print the image data 210. By comparison, selecting the print preview command results in the application program 204 itself displaying a preview of the image data 210 as it may look when printed by the inkjet-printing device 100.

Thus, the print command cedes control from the application program 204 to the driver program 208, where the image data 210 is transmitted from the program 204 to the program 208. By comparison, the print preview command does not cede control from the application program 204 to the driver program 208. Indeed, the print preview command in at least some embodiments may not involve the driver program 208, if the application program 204 already has certain information regarding the inkjet-printing device 100 that is currently selected to print the image data 210. Rather, the print preview command results in the application program 204 itself displaying a preview of the image data 210, as opposed to, for instance, the driver program 208 displaying the preview of the image data 210.

Figure 4C:
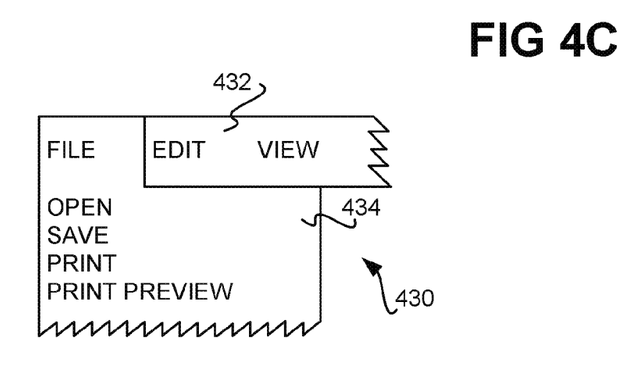

FIG. 4C shows a graphical user interface element 430 of the application program 204 that may be displayed to the user and from which the user can select the print command within the application program 204, according to an embodiment of the present disclosure. The graphical user interface element 430 includes a menu bar 432, representing menus such as a file menu 434, an edit menu, a view menu, and so on. Within the menu bar 432, the user has selected the file menu 434, which is specifically displayed in FIG. 4C. Within the file menu 434 are menu items such as an open menu item, a save menu item, a print menu item, and a print preview menu item. By selecting the print menu item, the user can select the print command within the application program 204, which cedes control to the driver program 208 as has been described. By comparison, the user can also select the print preview command by selecting the print preview menu item, such that control is not ceded to the driver program 208.

Referring back to FIG. 3, once the user has selected the print command from the application program 204, the driver program 208 receives the image data 210 from the application program 204 (310), and processing control is ceded to the driver program 208. The driver program 208 displays a print preview of the image data 210, such that pixels of the image data 210 having the replacement color are displayed in a manner approximating the specialty ink within the specialty ink cartridge 108S installed in part 302 (312). That is, the pixels of the image data 210 that have the replacement color are not displayed with this replacement color, but rather are displayed differently, in a manner that shows that the specialty ink will be used to print the image data 210. It is further noted that the print preview of part 312 is displayed and performed by the driver program 208, not the application program 204, which is a different program than the driver program 208.

Figure 4D:
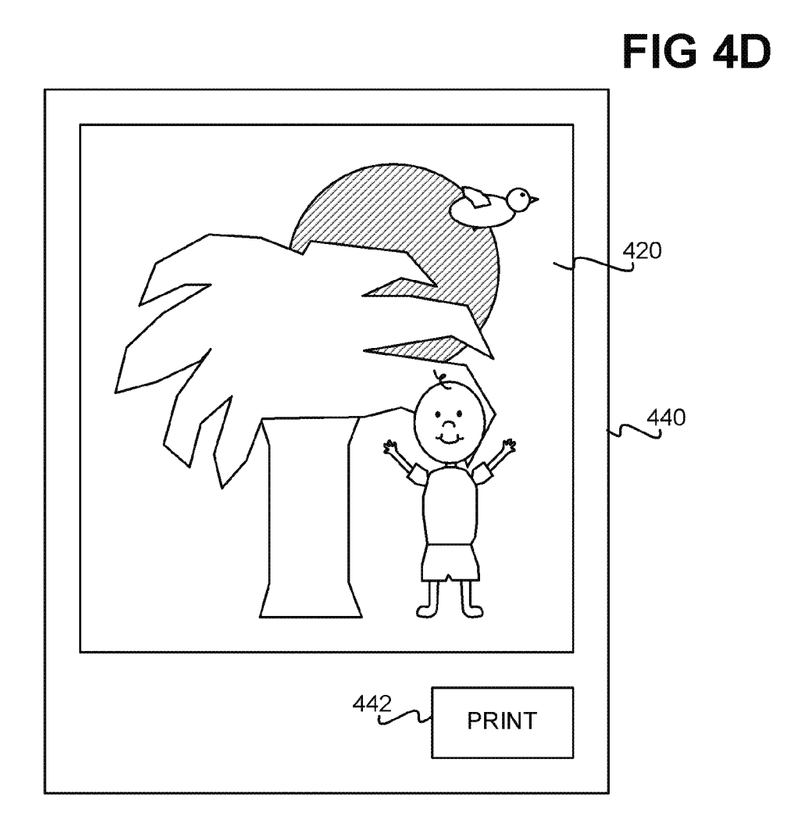

FIG. 4D shows a graphical user interface window 440 that the driver program 208 may display as including the representative image 420 as the image data 210, according to an embodiment of the present disclosure. The graphical user window 440 thus includes the representative image 420, as well as a print button 442. Those of ordinary skill within the art can appreciate that the window 440 may include other buttons, in addition to and/or in lieu of the print button 442, as may be customary.

The representative image 420 is displayed within the window 440 such that the sun of the image 420 is not displayed as having the replacement color (i.e., its original yellow, orange, and/or red color), but rather is displayed in a manner that approximates the specialty ink that will be used when the image 420 is printed. This is indicated by shading of the sun in FIG. 4D. For example, if the specialty ink is metallic silver ink, then the sun may be displayed in silver, instead of its original yellow, orange, and/or red. Therefore, the user is able to see a preview that approximates how the image 420 will look when it is printed on media by the inkjet-printing device 100 using this specialty ink.

Referring back to FIG. 3, the driver program 208 may also display the image data 210 in other ways in relation to the pixels of the image data 210 that have the replacement color that has been selected (314). For instance, the window 440 of FIG. 4D may have one or more additional buttons corresponding to these other ways in which the image data 210 can be displayed. As such, the user may be permitted to select that the image data 210 be displayed in a way other than the way it has been displayed in part 312, where FIG. 4D shows an example of this displaying in part 312.

As one example, the image data 210 may be displayed so that the pixels of the image data 210 having the replacement color are displayed with this original, replacement color, instead of in a manner approximating how the image data 210 will look when it is printed on media using the specialty ink. As another example, the image data 210 may be displayed so that the pixels of the image data 210 having the replacement color are not displayed at all, such that only the other pixels of the image data 210, which do not have this replacement color, are displayed. As a third example, the image data 210 may be displayed so that just the pixels of the image data 210 having the replacement color are displayed—either in their original replacement color or in the manner approximating how the image data 210 will look when it is printed using the specialty ink. In this last example, the other pixels of the image data 210, which do not have the replacement color, are not displayed.

Once the user is satisfied with how the image data 210 will look when it is printed, the user indicates to the driver program 208 that printing should commence. For instance, the user may select the print button 442 within the window 440 of FIG. 4D. Thereafter, the driver program 208 causes the inkjet-printing device 100 to print the image data 210 on media such as paper or another type of media (316). In particular, the image data 210 is printed such that pixels of the image data 210 that have the replacement color are printed using the specialty ink.

For instance, ordinarily the pixels of the image data 210 that have the replacement color are printed by accordingly ejecting drops or droplets of standard cyan, magenta, yellow, and/or black inks to realize the replacement color. In lieu of this, these pixels of the image data 210 are instead printed with the specialty ink in question. For example, in the representative image 420 of FIGS. 4B and 4D, the sun is not printed with the standard cyan, magenta, yellow, and/or black inks to realize the original red, orange, and/or yellow replacement color. Rather, the sun is printed using the specialty ink. In one embodiment, just and only the specialty ink is used to print such pixels of the image data 210 that have the replacement color that has been selected. Thus, rather than using the standard inks to print the pixels having the replacement color, the specialty ink is instead used to print the replacement color.

It is noted that in the embodiment of FIG. 1A, the user will have replaced the standard black ink cartridge 108K with the specialty ink cartridge 108S to print pixels of the image data 210 that have the replacement color with the specialty ink from the cartridge 108S. In such instance, there is no standard black ink available for the inkjet-printing device 100 to print pixels of the image data 210 that have colors which would ordinarily and normally be printed using such standard black ink, because the standard black ink cartridge 108K has been uninstalled from the inkjet-printing device 100. Therefore, a composite black color is realized to replace the standard black ink for printing pixels that otherwise would have been printed using the standard black ink at least in part. The composite black color can be realized, for instance, by combining the standard cyan, magenta, and yellow inks, such as in equal amounts. For example, for eight-bit color, the cyan, magenta, and yellow values of $2^8-1=255$, 255, 255 represent a composite black color that can be employed in lieu of a black value of $2^8-1=255$.

As have been described, embodiments of the present disclosure provide for advantages over the prior art. Existing application programs do not have to be specially designed to take advantage of using specialty inks when printing images created within these programs. Indeed, these application programs do not even have to be aware of, and may not be aware of, the fact that specialty inks will be used to print images created within these programs. Rather, a user simply has to define a replacement color, and use the replacement color when creating an image within an application program. Thereafter, the driver program automatically controls the inkjet-printing device in question to print all the pixels of the image that have this replacement color with the specialty ink instead.

Indeed, current application programs have no knowledge of specialty inks, and therefore provide no interface to users to specify usage of such specialty inks. Nevertheless, embodiments of the present disclosure permit images generated using such application programs to still be printed with specialty inks. This is because the driver program is provided with a methodology by which specialty ink usage can be specified—via the selection or determination of a replacement color. As such, the driver program can be said to located on top of the application program in a separate, independent layer providing this specialty ink usage functionality.

Furthermore, existing inkjet-printing devices may not have to be purposefully designed to use the specialty inks, but may nevertheless be able to use the specialty inks when printing images. Rather than an inkjet-printing device automatically detecting insertion of a specialty ink cartridge, for instance, a user may indicate to the driver program that a specialty ink cartridge has been inserted into the device in lieu of a standard black ink cartridge, for example. As a result, the driver program automatically controls this inkjet-printing device to print pixels of the image that have the replacement color that has been selected with the specialty ink. It is noted that the driver program in this situation is said to perform determining a replacement color and printing the image using the specialty ink in response to the user installing the specialty ink cartridge—viz., where the user indicated to the driver program that the specialty ink cartridge has been inserted into the inkjet-printing device, instead of the device detecting such installation and communicating this fact to the driver program.

Pixels of the image that would normally and ordinarily be printed using standard black ink—such as black and gray pixels—would instead be printed using a composite black color, as has been described. Thus, the driver program automatically controls the inkjet-printing device to print such other pixels of the image that would normally and ordinarily be printed using standard black by instead using a composite black color. The inkjet-printing device does not have to be aware—and indeed, may not be aware—that the standard black ink cartridge has been replaced by a specialty ink cartridge. Because the driver program controls the ejection of inks by the inkjet-printing device, the inkjet-printing device may believe that it is printing standard black ink when in fact it is printing specialty ink.

We claim:

1. A method for printing an image having a plurality of pixels with an inkjet-printing device receptive to one or more standard ink cartridges, the standard ink cartridges containing standard cyan ink, standard magenta ink, standard yellow ink, and standard black ink that are used to print full-color images on media, the method comprising:
   in response to a user installing a specialty ink cartridge into the inkjet-printing device, where the specialty ink cartridge contains specialty ink that is a type of ink other than types of the standard cyan ink, the standard magenta ink, the standard yellow ink, and the standard black ink,
   receiving user identification of a replacement color present in one or more pixels of the image, the replacement color defined as a combination of a red value, a green value, and a blue value, the replacement color ordinarily printed using one or more of the standard cyan ink, the standard magenta ink, the standard yellow ink, and the standard black ink from the standard ink cartridges; and,
   printing the image on the media by:
      printing each pixel of the image of the replacement color using the specialty ink from the specialty ink cartridge;
      printing each pixel of the image of any color other than the replacement color using the one or more of the standard cyan ink, the standard magenta ink, the standard yellow ink, and the standard black ink from the standard ink cartridges.

2. The method of claim 1, wherein the specialty ink is one or more of: metallic ink, glossy ink, and embossing ink, where the embossing ink dries at least substantially above a surface of the media to provide the image printed on the media with one or more portions raised above the surface of the media where the embossing ink has been used to print the image.

3. The method of claim 1, wherein the user installs the specialty ink cartridge into an ink cartridge slot of the inkjet-printing device designed for installation of the specialty ink cartridge.

4. The method of claim 1, wherein the user installs the specialty ink cartridge into an ink cartridge slot of the inkjet-printing device designed for installation of one of the standard ink cartridges.

5. The method of claim 1, further comprising, in response to the user selecting a print command from an application program, the print command being a different command than a print preview command,
   receiving, from the application program, the image having the pixels that have the replacement color; and,
   displaying the image such that the pixels thereof that have the replacement color are instead displayed in a manner approximating the specialty ink so that the user sees a preview of how the image will be printed when the pixels having the replacement color are printed using the specialty ink.

6. The method of claim 1, further comprising, after receiving user identification of the replacement color,
   defining the replacement color as any color within a threshold of the replacement color, such that each pixel of the image having a color within the threshold of the replacement color is printed using the specialty ink from the specialty ink cartridge.

7. The method of claim 1, wherein the specialty ink has no relationship or association with the replacement color except that the specialty ink is used to print the pixels of the image having the replacement color, in that the specialty ink does not have a color similar to the replacement color.

8. An inkjet-printing device comprising:
   a first ink cartridge slot receptive to installation of both a first standard ink cartridge and a specialty ink cartridge, where just one of the first standard ink cartridge and the specialty ink cartridge can be installed within the first ink cartridge slot at any given time, the first standard ink cartridge containing one of standard cyan ink, standard magenta ink, standard yellow ink, and standard black ink, the specialty ink cartridge containing specialty ink that is a type of ink other than types of the standard cyan ink, the standard magenta ink, the standard yellow ink, and the standard black ink;
   one or more second ink cartridge slots receptive to installation of one or more second standard ink cartridges, each second standard ink cartridge containing one or more of the standard cyan ink, the standard magenta ink, the standard yellow ink, and the standard black ink;

a detection mechanism to detect whether the first standard ink cartridge or the specialty ink cartridge has been installed within the first ink cartridge slot; and, an inkjet-printing mechanism to print an image on media, the image having one or more pixels of a replacement color ordinarily printed using one or more of the standard cyan ink, the standard magenta ink, the standard yellow ink, and the standard black ink from the first and the second standard ink cartridges, such that the pixels having the replacement color are printed using the specialty ink from the specialty ink cartridge instead of using the one or more of the standard cyan ink, the standard magenta ink, the standard yellow ink, and the standard black ink from the first and the second standard ink cartridges, when the detection mechanism has detected that the specialty ink cartridge has been installed within the first ink cartridge slot.

9. The inkjet-printing device of claim 8, wherein the specialty ink is one or more of: metallic ink, glossy ink, and embossing ink, where the embossing ink dries at least substantially above a surface of the media to provide the image printed on the media with one or more portions raised above the surface of the media where the embossing ink has been used to print the image.

10. The inkjet-printing device of claim 8, wherein the first standard ink cartridge is a standard black ink cartridge containing just the standard black ink, and wherein the specialty ink cartridge is installed in the first ink cartridge slot in lieu of the standard black ink cartridge, the image being printed on the media such that one or more other pixels of the image that have colors that are ordinarily printed using the standard black ink from the standard black ink cartridge are instead printed using a composite black color realized by combining the standard cyan ink, the standard magenta ink, and the standard yellow ink.

11. The inkjet-printing device of claim 8, wherein the second ink cartridge slots are receptive to one of:

a single standard ink cartridge containing the standard cyan ink, the standard magenta ink, and the standard yellow ink;

a standard cyan ink cartridge containing the standard cyan ink, a standard magenta ink cartridge containing the standard magenta ink, and a standard yellow ink cartridge containing the standard yellow ink.

12. The inkjet-printing device of claim 8, further comprising a detection mechanism to detect whether the specialty ink cartridge or the first standard ink cartridge has been installed within the first ink cartridge slot.

13. The inkjet-printing device of claim 8, wherein the detection mechanism optically detects a marking on the specialty ink cartridge that identifies the specialty ink cartridge as containing the specialty ink, to detect that the specialty ink cartridge has been installed within the first ink cartridge slot.

14. The inkjet-printing device of claim 8, wherein the detection mechanism has a mechanical feature that interacts with a corresponding mechanical feature of the specialty ink cartridge, to detect that the specialty ink cartridge has been installed within the first ink cartridge slot.

15. The inkjet-printing device of claim 8, wherein the detection mechanism reads one more of bits of data imprinted on the specialty ink cartridge that identifies the specialty ink cartridge as containing the specialty ink, to detect that the specialty ink cartridge has been installed within the first ink cartridge slot.

16. The inkjet-printing device of claim 8 wherein the detection mechanism electrically retrieves one or more bits of data stored within a memory of the specialty ink cartridge that identifies the specialty ink cartridge as containing the specialty ink, to detect that the specialty ink cartridge has been installed within the first ink cartridge slot.

17. A non-transitory computer-readable medium having one or more computer programs stored thereon, the computer programs implementing a driver program for an inkjet-printing device receptive to one or more standard ink cartridges, the standard ink cartridges containing standard cyan ink, standard magenta ink, standard yellow ink, and standard black ink that are used to print full-color images on media, the computer programs to perform a method comprising:

in response to a user installing a specialty ink cartridge into the inkjet-printing device, where the specialty ink cartridge contains specialty ink that is a type of ink other than types of the standard cyan ink, the standard magenta ink, the standard yellow ink, and the standard black ink, receiving user identification of a replacement color present in one or more pixels of an image having a plurality of pixels, the replacement color defined as a combination of a red value, a green value, and a blue value, the replacement color ordinarily printed using one or more of the standard cyan ink, the standard magenta ink, the standard yellow ink, and the standard black ink from the standard ink cartridges; and, causing the inkjet-printing device to print the image on the media by:

printing each pixel of the image of the replacement color using the specialty ink from the specialty ink cartridge;

printing each pixel of the image of any color other than the replacement color, using the one or more of the standard cyan ink, the standard magenta ink, the standard yellow ink, and the standard black ink from the standard ink cartridges, wherein the specialty ink has no relationship or association with the replacement color except that the specialty ink is used to print the pixels of the image having the replacement color, in that the specialty ink does not have a color similar to the replacement color.

18. The non-transitory computer-readable medium of claim 17, wherein the specialty ink is one or more of: metallic ink, glossy ink, and embossing ink, where the embossing ink dries at least substantially above a surface of the media to provide the image printed on the media with one or more portions raised above the surface of the media where the embossing ink has been used to print the image.

19. The non-transitory computer-readable medium of claim 17, the method further comprising, in response to the user selecting a print command from an application program, the print command being a different command than a print preview command, receiving, from the application program, the image having the pixels that have the replacement color; and, displaying the image such that the pixels thereof that have the replacement color are instead displayed in a manner approximating the specialty ink so that the user sees a preview of how the image will be printed when the pixels having the replacement color are printed using the specialty ink, wherein the driver program is a different program than the application program.

\* \* \* \* \*